United States Patent Office 3,170,935
Patented Feb. 23, 1965

3,170,935
6-METHYL STEROIDS AND PROCESS FOR PRODUCING SAME
Winifred June Adams, Bernard Ellis, Vladimir Petrow, and Isobel Ann Stuart-Webb, all of London, England, assignors to The British Drug Houses Limited, London, England, a British company
No Drawing. Filed Oct. 6, 1959, Ser. No. 844,648
Claims priority, application Great Britain, June 9, 1955, 16,645/55; June 20, 1955, 17,799/55; June 22, 1955, 18,118/55
8 Claims. (Cl. 260—397.3)

This invention is for improvements in or relating to organic compounds and has particular reference to the preparation of new 6β-methyl-3-oxo-Δ⁴-steroids of the androstane and pregnane series. This application is a continuation-in-part of our copending applications Serial No. 590,119 filed June 8, 1956, now abandoned, and Serial No. 592,243 filed June 19, 1956.

It is an object of the invention to provide new compounds of the androstane and pregnane series which are of value on account of their biological properties (e.g. anabolic and androgenic activity or progestational properties), or as intermediates in the preparation of compounds with useful biological properties, for example, in the preparation of 6α-methyl-3-oxo-Δ⁴ steroids of the androstane and pregnane series which are valuable as anabolic and progestational agents.

The invention provides new 6β-methyl-3-oxo-Δ⁴-steroids of the androstane and pregnane series and in particular the compounds 17β-hydroxy-6β-methylandrost-4-en-3-one (6β-methyltestosterone), 6β-methylandrost-4-ene-3:17-dione, 17α - ethinyl - 17β - hydroxy - 6β-methyl-androst-4-en-3-one (6β-methyl ethisterone), and 6β-methylpregn-4-ene-3:20-dione (6β-methyl progesterone). These compounds, as disclosed in our copending application Serial No. 592,243, are readily isomerized to the corresponding 6α-methyl epimers by alkaline or acidic reagents.

According to the present invention there is provided a method for the preparation of 6β-methyl-3-oxo-Δ⁴-steroids of the androstane and pregnane series having the general formula

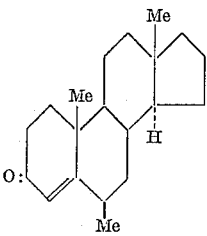

(I)

which method comprises oxidising a 3β-hydroxy-6β-methyl-Δ⁴-steroid of the androstane and pregnane series having the general formula

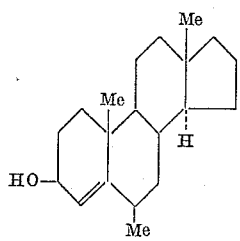

(II)

A mild oxidising agent, such for example as manganese dioxide, is preferably employed.

Alternatively, the 6β-methyl-3-oxo-⁴Δ-steroids of the androstane and pregnane series (Formula I above) may be prepared by oxidising a 3β:5α-dihydroxy-6β-methyl steroid of the androstane and pregnane series of the general Formula III (below)

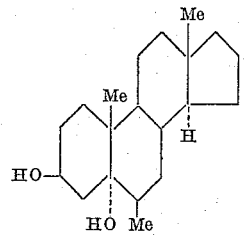

(III)

to give a 5α-hydroxy-6β-methyl-3-oxo derivative having the general formula

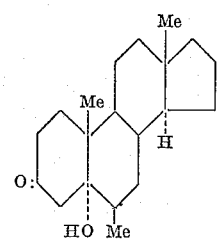

(IV)

and dehydrating the 5α-hydroxy-6β-methyl-3-oxo derivative. The oxidising agent is preferably chromium trioxide in acetic acid or pyridine or potassium chromate in aqueous acetic acid but other oxidants such for example as N-bromoacetamide may also be employed. The dehydrating agent may be thionyl chloride in pyridine at 0° C. but other dehydrating agents may be used. For example, the Oppenauer reagent (i.e. aluminum isopropoxide or tert.-butoxide in toluene and cyclohexanone) may be employed to perform the oxidation reaction and the dehydration reaction in one operation. Hydroxyl groups (other than those at $C_3$ and $C_5$) and oxo-groups (other than those at $C_3$) present in the intermediates leading to compound (I) which may undergo change during the oxidation and dehydration reactions will naturally be protected in suitable manner by methods well known to those skilled in the art and subsequently regenerated. The choice of procedure for the preparation of any particular 6β-methyl-3-oxo-Δ⁴-steroid described herein has been found to depend upon the nature of the substituents borne by the immediate precursor.

Following is a description by way of example of methods of carrying the invention into effect:

EXAMPLE 1

6β-methyltestosterone (a) 6β-methylandrost-4-en-3β:17β-diol (600 mg.) in dry benzene (120 ml.) was shaken for three days with freshly prepared manganese dioxide (4 g.). Thereafter, inorganic material was removed by filtration and washed several times with warm benzene. The combined filtrate and washings was washed with dilute hydrochloric acid, then with dilute aqueous sodium carbonate and finally with water. The solid residue obtained after drying and removal of the solvent was crystallised from acetone/hexane to give 17β-hydroxy-6β-methylandrost-4-en-3-one (6β-methyltestosterone) in needles, M.P. 212 to 214° C., $[\alpha]_D^{26°}+57°$ (c., 0.837 in chloroform), $\lambda_{max}241$ mμ (4.19) in isopropanol.

(b) 6β-methylandrost-4-en-3β:17β-diol (200 mg.) in dry isopropanol (5 ml.) and dry acetone (2 ml.) was treated with aluminium tert.-butoxide (1 g.) for 18 hours at room temperature. After dilution with dilute hydrochloric acid, the product was isolated with ether and purified from acetone/hexane. 6β - methyltestosterone was obtained in needles, M.P. 212 to 214° C., not depressed in admixture with a specimen prepared by method (a) above.

6β-methyltestosterone (100 mg.) in methanol (36 ml.) was heated with potassium hydroxide (400 mg.) under reflux in a stream of nitrogen for 20 hours. After dilution with water and acidification with acetic acid, the product was extracted with ether. Removal of the ether left a crystalline residue which was purified with ethanol to give 6α-methyltestosterone, M.P. 154 to 155° C., $[\alpha]_D^{26°}+90°$ (c., 0.34 in chloroform), $\lambda_{max}241m\mu$ (4.2) in isopropanol.

EXAMPLE 2

6β-methylandrost-4-ene-3:17-dione (a) 6β - methylandrostane-3β:5α:17β-triol (prepared by the method of Ushakov and Kosheleva, J. Gen. Chem. U.S.S.R. 1940, 10, 213) (2.57 g., crude) was dissolved in acetic acid (100 ml.) (distilled over chromium trioxide) and cooled to <10° C. Chromium trioxide (2.5 g.) in acetic acid (40 ml.) and water (10 ml.) was added dropwise over 20 minutes, keeping the temperature at 10° to 15° C. The mixture was stirred at room temperature for a further 2½ hours. Methanol was added, and much of the acetic acid was removed in vacuo. After isolating with ethyl acetate, 5α - hydroxy - 6β-methylandrostane-3:17-dione, M.P. 226 to 227° C., $[\alpha]_D^{24°}+68°$ (c., 0.324 in chloroform) was obtained as needles from acetone/hexane.

5α-hydroxy-6β-methylandrostane-3:17-dione (200 mg.) in dry pyridine (3 ml.) was cooled to 0° C. Purified thionyl chloride (0.12 ml.) was added dropwise and the mixture kept at 0° C. for five minutes. On treating with water a precipitate was formed, which was filtered off and dried. Crystallisation from acetone/hexane gave 6β-methylandrost-4-en-3:17-dione in needles, M.P. 212 to 213° C., $[\alpha]_D^{22°}+141°$ (c., 0.356 in chloroform), $\lambda_{max}240m\mu$ (4.2) in isopropanol.

(b) 6β - methylandrostane - 3β:5α:17β - triol (820 mg.) in toluene (8 ml.) and cyclohexanone (10 ml.) was treated with aluminium tert.-butoxide (1 g.) and the mixture heated under reflux for 2 hours. After washing with aqueous Rochelle salt, the solvents were removed by steam-distillation, and the oily product in pyridine (8 ml.) added at 5° C., to chromium trioxide (800 mg.) in pyridine (8 ml.). The reaction mixture was left overnight at room temperature and the product isolated with benzene. Chromatography on alumina (25 g.) gave 6β-methylandrost-4-en-3:17-dione, identical with a sample prepared by method (a). 6β-methylandrost-4-en-3:17-dione (25 mg.) in methanol (9 ml.) was refluxed for 19 hours under nitrogen with potassium hydroxide (100 mg.) in water (1 ml.). The mixture was neutralized with acetic acid, and the product isolated with ether. 6α-methylandrost-4-ene-3:17-dione was obtained, crystallizing from acetone/hexane in needles, M.P. 162° C.

EXAMPLE 3

6β-methylethisterone

A solution of 17α - ethinyl-6β-methylandrostane-3β:5α:17β-triol (4.5 g.) in toluene (200 ml.) and cyclohexanone (40 ml.) was distilled until 50 ml. of distillate had collected. After the addition of aluminium isopropoxide (2.5 g.) in toluene (10 ml.) the mixture was refluxed for 1 hour, cooled, washed with dilute mineral acid, and the solvents removed by steam-distillation. The crystalline product was purified from aqueous ethanol to give fine needles of 17α-ethinyl-17β-hydroxy-6β-methylandrost-4-en-3-one (6β-methylethisterone), M.P. 223 to 225° C., $[\alpha]_D^{20°}-22°$ (c., 0.80 in chloroform), $\lambda_{max}241m\mu$ (4.25) in isopropanol. 6β-methylethisterone (1.5 g.) in aqueous ethanol (60 ml. of 95%) containing potassium hydroxide (1.5 g.) was heated under reflux for 5 hours. The mixture was diluted with water, the product extracted with ether, and the washed and dried extract concentrated to low volume. The crystalline deposit was purified from aqueous methanol to give 17α-ethinyl - 17β - hydroxy - 6α - methylandrost - 4 - en - 3-one (6α-methylethisterone), prisms, M.P. 195 to 197° C., $[\alpha]_D^{20°}+34.5°$ (c., 0.87 in chloroform).

EXAMPLE 4

6β-methylprogesterone (a) 6β-methylallopregnane-3β:5α:20(α+β)triol (5 g.) in acetic acid (50 ml.) was treated with chromium trioxide (3 g.) in 85% acetic acid (150 ml.) and the mixture kept overnight at room temperature. Addition of water gave a solid which was collected and purified from ethanol. 5α - hydroxy - 6β - methylallopregnane-3:20-dione formed prisms, M.P. 255 to 256° C., $[\alpha]_D^{25°}+64.5°$ (c., 0.49 in chloroform).

Thionyl chloride (1.2 ml.) was added dropwise to a solution of 5α - hydroxy - 6β - methylallopregnane-3:20-dione (2 g.) in dry pyridine (35 ml.) maintained at 0° C. After a further 10 minutes at this temperature the mixture was poured into ice-water and the product isolated with ether. Crystallised from aqueous methanol, 6β - methylpregn - 4 - ene - 3:20 - dione (6β-methylprogesterone) formed needles, M.P. 169 to 171° C., $[\alpha]_D^{24°}+141°$ (c., 0.954 in chloroform), $\lambda_{max}242m\mu$ (4.27) in ethanol.

(b) A solution of 6β-methylallopregnane-3β:5α:20 (α+β)triols (1.5 g.) in toluene (100 ml.) and cyclohexanone (40 ml.) was distilled until 30 ml. of distillate had collected. Aluminium isopropoxide (2.5 g.) in toluene (10 ml.) was then added and the mixture refluxed for 1 hour. The cooled mixture was washed with dilute mineral acid, the solvents removed by steam-distillation, and the product isolated with ether. It was chromatographed on alumina (25 g.) employing benzene as eluent, when solid materials were obtained from the early fractions. These were purified from aqueous methanol to give flat needles of 6β-methylprogesterone, M.P. 171° C., identical with a specimen prepared by method (a) above. 6β-methylprogesterone (600 mg.) in methanol (25 ml.) was heated with potassium hydroxide (500 mg.) in water (5 ml.) under reflux in a stream of nitrogen for 16 hours. The product was isolated with ether and yielded 6α - methylpregn-4-ene-3:20-dione (6α - methylprogesterone) as flaky needles, M.P. 122 to 123° C., $[\alpha]_D^{27°}+177°$ (c., 1.05 in chloroform), after crystallization from aqueous methanol.

We claim:
1. 6β-methylandrost-4-ene-3:17-dione.
2. 17α - ethinyl - 17β - hydroxy - 6β - methylandrost-4-ene-3-one.
3. 6β-methyl progesterone.
4. A method for the preparation of 6β-methyl-3-oxo-Δ⁴-steroids of the androstane and pregnane series which method comprises contacting with manganese dioxide a corresponding 3β-hydroxy-6β-methyl-Δ⁴ steroid to convert the 3β-hydroxy group to a 3-keto group.
5. A method for the preparation of 6β-methyl-3-oxo-Δ⁴ steroids of the androstane and pregnane series which method comprises contacting with a chromic oxidising agent a corresponding 3β:5α-dihydroxy-6β-methyl steroid of the androstane and pregnane series to oxidize said steroid to a corresponding 5α-hydroxy-6β-methyl-3-oxo derivative and contacting the 5α-hydroxy-6β-methyl-3-oxo derivative with thionyl chloride in pyridine to remove the 5α-hydroxy group and introduce a double bond at the Δ⁴ position.
6. A method as claimed in claim 5 wherein thionyl chloride in pyridine at 0° C. is employed
7. A method for the preparation of 6β-methyl-3-oxo-Δ⁴ steroids of the androstane and pregnane series which method comprises oxidising and dehydrating a corresponding 3β:5α-dihydroxy-6β-methyl steroid of the androstane and pregnane series in a single stage by contacting said corresponding steroid with an aluminum alkoxide in an organic solvent.

8. 5α-hydroxy-6β-methylallopregnane-3:20-dione.

References Cited by the Examiner

Campbell et al.: "Journ. Amer. Chem. Soc." (1958), vol. 80, pp. 4717–21.

David et al.: "Journ. Pharm. & Pharmosol." (1957), p. 929.

Madaeva et al.: "Zhurnal Obshchei Khimei," vol. 10 (1940), No. 3, pp. 213–216.

Ringold et al.: "Journal Organic Chemistry" (1957), vol. 22, pp. 99–100.

LEWIS GOTTS, *Primary Examiner.*

L. H. GASTON, M. LIEBMAN, *Examiners.*